United States Patent [19]

Caron et al.

[11] 4,170,780

[45] Oct. 9, 1979

[54] RECORDING HEAD FOR MULTIPOINT RECORDER

[75] Inventors: Patrick Caron, Molliens-Dreuil; Francis Manier, Sains en Amienois, both of France

[73] Assignee: Honeywell Inc., Minneapolis, Minn.

[21] Appl. No.: 950,255

[22] Filed: Oct. 10, 1978

[51] Int. Cl.² .......................... G01D 15/02; G01D 9/28
[52] U.S. Cl. ........................................ 346/141; 346/61
[58] Field of Search ................................ 346/46.61, 141

[56] References Cited

U.S. PATENT DOCUMENTS

| 3,693,180 | 9/1972 | Hasebe et al. | 346/141 X |
| 3,769,626 | 10/1973 | McClenahan | 346/141 X |
| 3,838,430 | 9/1974 | Digney | 346/141 X |
| 4,000,494 | 12/1976 | Digney | 346/141 X |

*Primary Examiner*—George H. Miller, Jr.
*Attorney, Agent, or Firm*—Laurence J. Marhoefer; Lockwood D. Burton; Mitchell J. Halista

[57] ABSTRACT

A recording head for a multipoint recorder including a drum bearing a number of stylii regularly spaced around the drum periphery and rotatably mounted on an axle in a moving carriage sliding along a bearing bar mounted in the chassis of the recorder, means for rotational driving said drum means for temporarily displacing the drum in the direction of the strip chart and means for translational displacement of the carriage along the bearing bar with the means for rotational driving the stylii bearing drum has a Geneva cross rigidly connected to the drum and driven by a pin on a member wedged in a longitudinal nut in the bearing bar which is rotationally driven by a motor gear system mounted on the chassis of the device and that the means for causing the displacement of said recording head are formed by a cam rigidly connected to a gear wheel which meshes with a gear wheel of said pin bearing member whereby the cam is cooperating with an abutment of a housing supporting the stylii bearing drum and mounted on said carriage for free oscillation around an axle parallel to the bearing bar.

2 Claims, 7 Drawing Figures

RECORDING HEAD FOR MULTIPOINT RECORDER

BACKGROUND OF THE INVENTION

1. Field Of The Invention

The present invention relates to multipoint recorders. More specifically, the present invention relates to recording heads of such recorders.

2. Description Of The Prior Art

Multipoint recorders of this type comprise a recording head displaceable along a bar parallel to the plane of a recording strip chart and having a predetermined number of stylii for recording ink marks on the strip chart. This recording is done under control of an appropriate mechanism allowing a positioning of the selected stylus before the strip chart and by a subsequent tilting of the recording head against the strip chart for abutting the selected stylus against the strip chart.

In one such known devices of this type, the tilting of the recording head is achieved by an auxiliary bar parallel to the head bearing bar and translationally movable for tilting by an interconnection of a lever selectively movable to tilt the recording head around an axis parallel to the head bearing bar. In these known devices the tilting of the recording head also drives the stepwise rotation of a drum supporting the stylii and of a drum supporting a plurality of ink pads.

According to another type of device of this type the tilting of the recording head is achieved by an auxiliary bar controlled by a cam mounted in the chassis of the device. The stepwise rotation of the stylii bearing drum and the ink pad bearing drum is achieved by the rotation of the drum bearing bar which is controlled by a Geneva cross mechanism mounted on the chassis.

SUMMARY OF THE INVENTION

An object of the present invention is to provide an improved recording head having less space requirements while allowing the successive positioning of the different ink stylii around the drum as well as the tilting and the lowering with precision of the stylii bearing recording head for bringing one of the stylii temporarily in contact with the strip chart which is moving under the recording head.

In accomplishing this and other objects, there has been provided, in accordance with the present invention, a recording head for graphical multipoint recording including a drum bearing a number of stylii regularly spaced around the drum periphery and rotatably mounted on an axle in a moving carriage sliding along a bearing bar mounted in the chassis of the recorder, means for rotational driving said drum means for temporarily displacing the drum in the direction of the strip chart and means for translational displacement of the carriage along the bearing bar with the means for rotational driving the stylii bearing drum has a Geneva cross rigidly connected to the drum and driven by a pin on a member wedged in a longitudinal nut in the bearing bar which is rotationally driven by a motor gear system mounted on the chassis of the device and that the means for causing the displacement of said recording head are formed by a cam rigidly connected to a gear wheel which meshes with a gear wheel of said pin bearing member whereby the cam is cooperating with an abutment of a housing supporting the stylii bearing drum and mounted on said carriage for free oscillation around an axle parallel to the bearing bar.

With such a device one achieves by a simple rotation of the bearing bar at one time the successive positioning of the different styles and the temporary tilting of the recording head in the direction to the strip chart after each positioning of a new style in the series of styles borne by the drum.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
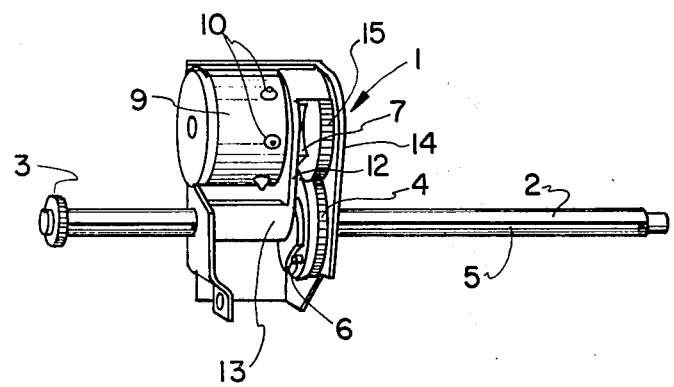
FIG. 1 is a perspective view from below of a recording head embodying the present invention.
Figure 2:
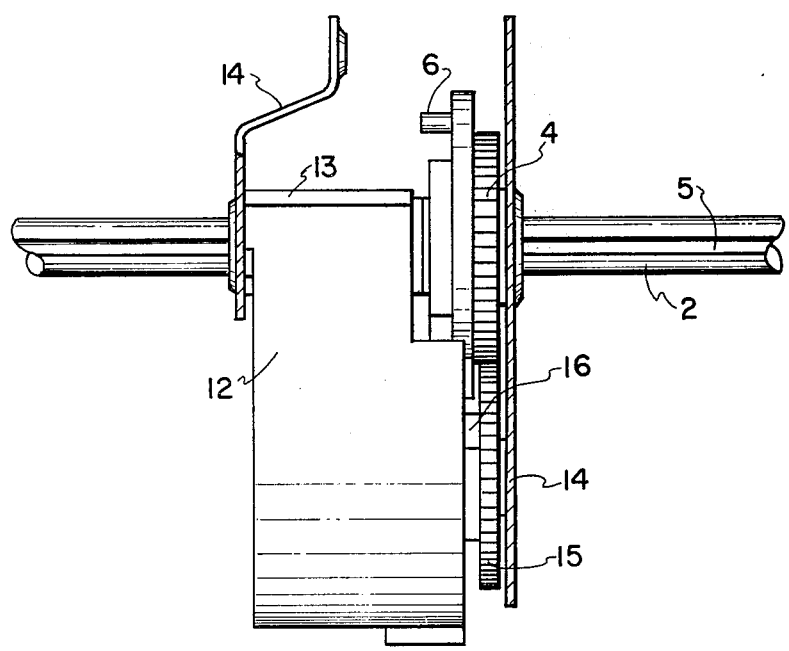
FIG. 2 is a part-sectional view parallel to the axle of the bearing bar of the head shown in FIG. 1.

In FIG. 1, there is shown a perspective bottom view of the recording head assembly according to the present invention. This recording head includes a carriage 1 translationally and rotationally movable on a bearing bar 2 which, in turn, is supported by the chassis (not shown) of a strip chart graphic recorder. Bar 2 bears at one end a gear wheel 3 driven by an electrical motor and an inter connected appropriate transmission (not shown).

Inside of the carriage 1, a gear wheel 4 is mounted on the bar 2 and secured with a nut 5 longitudinally worked into the bar 2. Gear wheel 4 bears two lateral pins 6 diametrical opposite to each other and arranged to alternatively drive a Geneva cross 7 in a known manner. The Geneva cross 7 is rigidly connected to an axle 8 on which a drum 9 is clamped bearing different recording points or pads 10 impregnated with ink as recording stylii.

Axle 8 rotates in a bearing 11 fixed in a housing 12 in which drum 9 is mounted. Housing includes a bearing 13 surrounding bar 2 and able to oscillate freely within an outer housing 14 enclosing the different members of the recording head. Gear wheel 4 meshes with gear wheel 15 mounted in the housing 14.

On the face of gear wheel 15 adjacent to the Geneva cross 7 two cams 16 are arranged diametrically opposite to each other with regard to the axle of rotation of gear wheel 15. Cams 16 are arranged to cooperate with an abutment 17 formed by an extension of the wall of housing 12 and lying in the trajectory of cams 16.

MODE OF OPERATION

In operation, the recording head described above and shown in perspective in FIG. 1 is arranged above the path of the strip chart (not shown) which is continuously moved, and it may be laterally displaced along bar 2 being driven by an endless cable (not shown) to which the carriage 1 is connected in a well-known manner. When the carriage 1 has arrived at the desired recording position it is lowered by a pivoting motion around bar 2 for momentarily applying one of the ink pads 10 onto the strip chart whereby a new recording ink pad or point is presented on the strip chart surface at each lowering of the carriage.

The intermittent rotation of drum 9 bearing the ink pads 10 is effected by the rotation of bar 2 driving the gear wheel 4 which is driving by means of the pins 6 the Geneva cross 7 rigidly connected to drum 9. The two pins 6 arranged diametrically opposite to each other allow advancing of the Geneva cross by a switching position at each half revolution of the bar 2.

Figure 3:
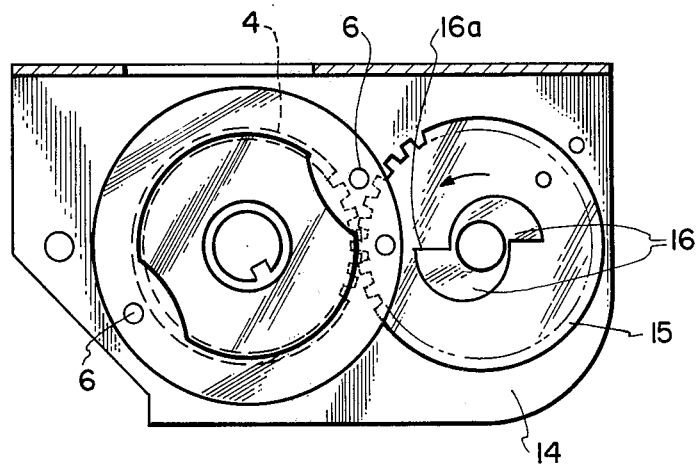
FIG. 3 is a view of a portion of the inner members of the carriage of the head shown in FIGS. 1 and 2.
Figure 4:
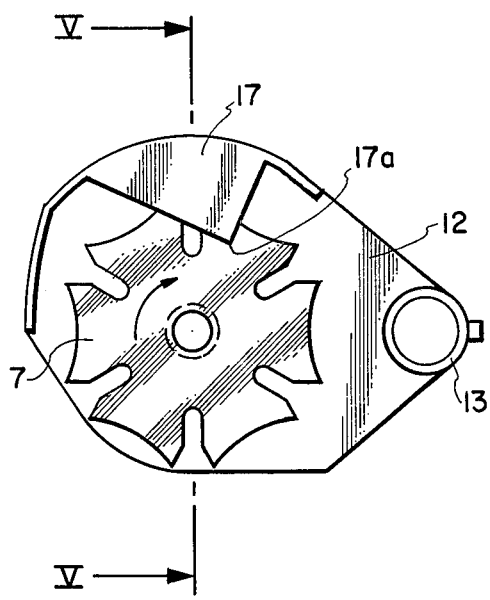
FIG. 4 is a view of the housing bearing the drum and the Geneva cross for driving the drum used in the head of FIG. 1.
Figure 5:
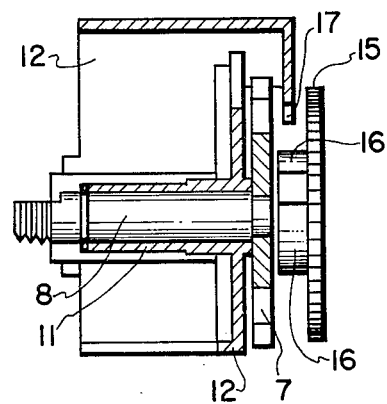
FIG. 5 is a sectional view following line V—V in the device of FIG. 4.

Simultaneously with each rotational driving or advancing of the Geneva cross 7, one of the cams 16 during its rotation (along the arrow in FIG. 3) is lifting the housing 12 by abutting against the rim of the abutment 17 and thereafter causes a lowering of the housing 12 when the rim of the abutment 17a falls behind the extremity 16a of cam 16.

Figure 6:
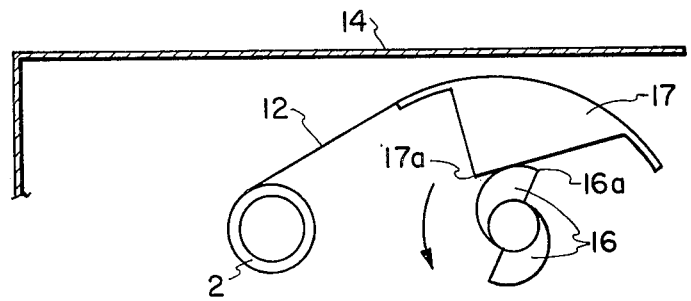
FIG. 6 is an illustration of the upper position of the recording head of FIG. 1.
Figure 6:
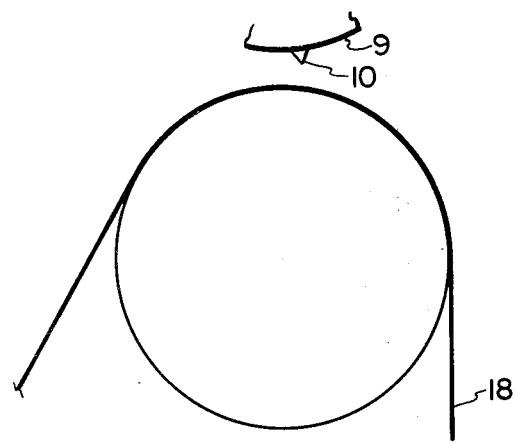
Figure 7:
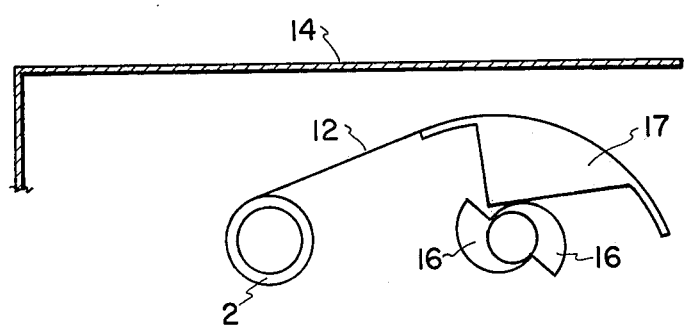
FIG. 7 is an illustration of the lower position of the recording head of FIG. 1.
Figure 7:
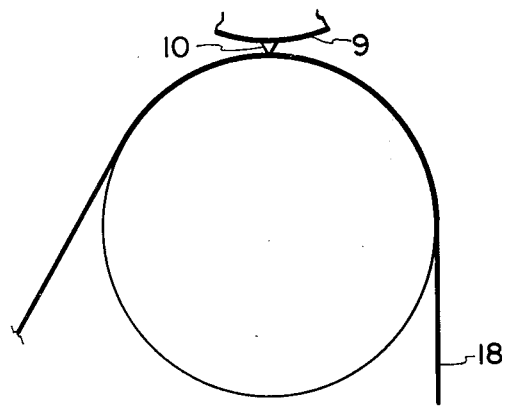

In FIG. 6, the lifting of the housing 12 by the cams 16 is schematically shown. In FIG. 7, the lower position is shown in which one of the ink pads 10 contacts the strip chart 18. The housing 12 falls back by gravity in pivoting around bar 2 within the inside of housing 14 which is not pivoting. By this falling back one of the ink pads 10 is applied against chart strip 18 (FIG. 7). Following this the second cam 16 lifts housing 12 and spaces the recording head from the strip chart 18.

Within a half revolution of bar 2, one of the ink points 10 has been replaced by the following one by lowering and lifting of the new ink point to mark the strip chart 18. The rotational drive of bar 2 may be either continuous or intermittent. It may be arranged also with a single pin 6 and a single cam 16 or with a number of pins and cams more than two.

Accordingly, it may be seen that there has been provided, in accordance with the present invention, an improved recording head allowing successive positioning of different ink stylii mounted around a drum while bringing one of the stylii into temporary contact with a strip chart.

The embodiments of the invention in which an exclusive property or privilege is claimed are defined as follows:

1. A recording head for graphical multipoint recording including a drum bearing a number of recording stylii regularly spaced around the periphery and rotatably mounted on an axle in a moving carriage sliding along a bearing bar mounted in the chassis of the recorder, means for rotational driving said drum, means for temporarily displacing the drum in the direction of the strip chart and means for translational displacement of the carriage along the bearing bar, characterized in that said means for rotational driving the stylii bearing drum comprises a Geneva cross rigidly connected to said drum and driven by a pin on a first gear wheel attached to the bearing bar which is rotationally driven and that the means for causing the displacement of said recording head includes a cam rigidly connected to a second gear wheel meshing said first gear wheel bearing said pin whereby said cam cooperates with an abutment of a housing supporting the stylii bearing drum and mounted on said carriage for free oscillation around an axle parallel to the bearing bar.

2. A recording head according to claim 1, and further characterized in that said first gear wheel has a second pin diametrically opposite to said first pin and that the cam bearing second gear wheel includes a second cam diametrically opposite to said first-mentioned cam and cooperating with said abutment on said housing.

* * * * *